United States Patent
Kim et al.

(10) Patent No.: US 9,457,280 B2
(45) Date of Patent: Oct. 4, 2016

(54) AUTO PROGRAM PREVENTING METHOD FOR AUCTION HOUSE FOR ON-LINE GAME ITEM AND SERVER THEREFOR

(71) Applicant: INTELLECTUAL DISCOVERY CO., LTD., Seoul (KR)

(72) Inventors: Woon Yong Kim, Suwon-si (KR); Chul Min Lee, Seongnam-si (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 296 days.

(21) Appl. No.: 14/369,870

(22) PCT Filed: Nov. 28, 2012

(86) PCT No.: PCT/KR2012/010133
§ 371 (c)(1),
(2) Date: Jun. 30, 2014

(87) PCT Pub. No.: WO2013/100400
PCT Pub. Date: Jul. 4, 2013

(65) Prior Publication Data
US 2014/0370973 A1 Dec. 18, 2014

(30) Foreign Application Priority Data
Dec. 28, 2011 (KR) ........................ 10-2011-0145298

(51) Int. Cl.
*A63F 9/24* (2006.01)
*A63F 13/85* (2014.01)
(Continued)

(52) U.S. Cl.
CPC ............. *A63F 13/85* (2014.09); *A63F 13/792* (2014.09); *G06F 17/30* (2013.01); *G06F 21/00* (2013.01); *G06Q 30/08* (2013.01); *G06F 2221/2109* (2013.01); *G06F 2221/2133* (2013.01)

(58) Field of Classification Search
None
See application file for complete search history.

(56) References Cited

U.S. PATENT DOCUMENTS 7,699,697 B2 * 4/2010 Darrah .................... G07F 17/32
463/16
7,801,775 B1 * 9/2010 Roseman ............... G06Q 30/06
705/26.1
(Continued)

FOREIGN PATENT DOCUMENTS

KR    10-2004-0063956 A    7/2004
KR    10-0823547 B1    5/2008
(Continued)

OTHER PUBLICATIONS

International Search Report issued in PCT Appln. No. KR/2012/010133 on Feb. 20, 2013, 4 pages.

*Primary Examiner* — Paul A D'Agostino (57) ABSTRACT

Disclosed are a method and a server for preventing search and bidding using an auto program in an item auction house of an on-line game. The present invention provides an auto program preventing server for an auction house of an on-line game, including: a repeated search ignoring unit which ignores a search during a predetermined search ignoring period when the same item is searched within a predetermined time a predetermined number of times or more, in an auction house where an item for an on-line game is registered and the item is auctioned off to a user which bids the highest price for the registered item; an excessive search restricting unit which, when the search is requested the number of times which is equal to or larger than a predetermined number of times, if an average search time interval between the predetermined number of times of search requests is shorter than a predetermined search time interval, restricts the search in the item auction house during a predetermined search restriction period; and an excessive bidding restricting unit which, when the predetermined number of times or more of bidding requests are issued in the item auction house, if the average bidding time interval between the predetermined number of times of bidding requests is shorter than the predetermined bidding time interval, restricts the bidding during a predetermined bidding restriction period.

15 Claims, 8 Drawing Sheets

(51) Int. Cl.
*G06F 21/00* (2013.01)
*G06Q 30/08* (2012.01)
*G06F 17/30* (2006.01)
*A63F 13/792* (2014.01)

(56) References Cited

U.S. PATENT DOCUMENTS

| | | | | |
|---|---|---|---|---|
| 8,103,574 B2 * | 1/2012 | Wiesehuegel | ......... | G06Q 40/04 705/37 |
| 8,251,702 B2 * | 8/2012 | Marks | ................... | A61G 12/00 434/238 |
| 8,825,529 B2 * | 9/2014 | Lutnick | ................. | G06Q 10/02 705/15 |
| 2002/0038282 A1 * | 3/2002 | Montgomery | ......... | G06Q 30/08 705/37 |
| 2002/0169711 A1 * | 11/2002 | Ginsberg | .............. | G06Q 40/04 705/37 |
| 2003/0105726 A1 * | 6/2003 | Itoh | ........................ | G06Q 30/08 705/80 |
| 2004/0098331 A1 * | 5/2004 | Benson | ................. | G06Q 40/04 705/37 |
| 2006/0218076 A1 * | 9/2006 | Walker | ................... | G06Q 30/08 705/37 |
| 2007/0032286 A1 * | 2/2007 | Muir | ................... | G07F 17/3255 463/16 |
| 2007/0235932 A1 * | 10/2007 | Karwat Singer | ....... | A63F 9/183 273/256 |
| 2008/0139317 A1 * | 6/2008 | Sheikh | .................... | G07F 17/32 463/42 |
| 2008/0235125 A1 * | 9/2008 | Danzan | ............. | G06Q 30/0605 705/37 |
| 2008/0313089 A1 * | 12/2008 | Du Preez | ........... | G06Q 30/0601 705/80 |
| 2009/0012877 A1 * | 1/2009 | Glasspool | .......... | G06Q 30/0601 705/26.3 |
| 2009/0124346 A1 * | 5/2009 | Baerlocher | ......... | G07F 17/3244 463/20 |
| 2010/0121728 A1 * | 5/2010 | Sun | .................... | G06Q 30/0601 705/26.1 |
| 2010/0317420 A1 * | 12/2010 | Hoffberg | ........... | G06Q 30/0207 463/1 |
| 2011/0066518 A1 * | 3/2011 | Mack | .................... | G06Q 30/08 705/26.3 |
| 2011/0231264 A1 * | 9/2011 | Dilling | ................. | G06Q 30/02 705/14.71 |
| 2011/0276452 A1 * | 11/2011 | Stephens | .............. | G06Q 10/087 705/35 |
| 2012/0284137 A1 * | 11/2012 | Beckham | ............ | G06Q 30/0601 705/26.3 |
| 2013/0073410 A1 * | 3/2013 | Bhogal | ................. | G06Q 30/08 705/26.3 |
| 2013/0073411 A1 * | 3/2013 | Bhogal | ................. | G06Q 30/08 705/26.3 |

FOREIGN PATENT DOCUMENTS

| | | |
|---|---|---|
| KR | 10-0968268 B1 | 7/2010 |
| KR | 10-0976861 B1 | 8/2010 |

\* cited by examiner

AUTO PROGRAM PREVENTING METHOD FOR AUCTION HOUSE FOR ON-LINE GAME ITEM AND SERVER THEREFOR

CROSS REFERENCE TO RELATED APPLICATIONS

This application is a 35 U.S.C. §371 National Phase Entry Application from PCT/KR2012/010133, filed Nov. 28, 2012, and designating the United States, which claims priority under 35 U.S.C. §119 to Korean Patent Application No. 10-2011-0145298 filed Dec. 28, 2011, which are incorporated herein in their entireties.

TECHNICAL FIELD

The present invention relates to an auto program preventing technology of an on-line game, and more particularly to a method for preventing a specific item from being repeatedly searched using an auto program in an auction house for an on-line game item or being excessively searched or bid within a short time and an auto program preventing server.

BACKGROUND ART

As a network has been developed, various on-line game services have been provided. Further, improvement of performance of graphics techniques and game user terminal results in game programs with high specifications and also provides game contents which precisely describe a real world and a virtual world.

The on-line game has various genres. An on-line game which is representatively used by users includes a sport game. The sport game includes a video game and a computer game which is played using a user terminal by a single user, and an on-line sport game through which a user competes with other users or cooperatively plays together with other users. In such a sport game, the user manipulates a coach or a player to artificially-intelligently play the sport game in game contents or plays a game with another team which is played by the other players in accordance with a sport rule and plays the game in order to beat the other team.

In the meantime, in the on-line game, in order to objectively represent an ability or a capacity of a user which is increased as a player plays a game more frequently, a concept of a level is adopted. As the capacity is increased as the user plays a game more frequently, the level of the user is also increased so that many items which are provided as an award can be secured. Some of the items need to be purchased in an item shop on a screen on which the on-line game is executed or an item shop of a web site to access the on-line game, or other items may be purchased through an auction house of an on-line game from other players.

When a user is at a high level and has lots of items, the user has a strong capacity in a game space. As described above, the level and the item are concepts introduced to increase participation of a user and interest in the game, but a twisted phenomenon in which the user tends to play the game in order to secure items and increase the level has occurred in recent years.

However, when the user continuously plays the on-line game, much time and effort are required. Accordingly, a program which creates a virtual player that is programmed to perform a predetermined action in a specific on-line game even when the user does not directly play the game is obscurely spread. Such a program is called an "auto player" and generally called an "auto". A user who uses the auto may continuously perform a desired action through the auto without directly playing the game, and thus easily increases the level and simultaneously secures many items as compared with a user who does not use the auto. Further, the user may participate in an item auction using the auto. There are some problems which may occur when the user participates in the item auction using the auto, as follows.

First, users who do not use the auto may have disadvantages. Generally, when the user participates in the auction without using the auto, it takes a lot of time to search and bid on a desired item in an auction house. However, when a specific user uses an auto for the auction house, the user rapidly searches and bids on an item to be bid instead of directly searching for the item. As a result, a chance of a user who does not use the auto to obtain the desired item in the auction house is considerably lowered and thus transaction of the item is depressed from a long-term viewpoint, which may adversely affect the popularity of the on-line game.

Further, the auto continuously consumes a network resource. This is because the auto does not feel fatigue like a person so that the auto repeatedly tries to search and bid on an item in the auction house, which means that the auto is connected to the auction house at all times. Accordingly, an on-line game manager needs to extend an accessible band width of the auction house and unnecessarily invests to increase a searching speed.

Therefore, a technology which detects an auto which automatically participates in the item auction of the on-line game is desperately demanded.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide an auto program preventing method for an item auction house of an on-line game which detects an auto program which automatically participates in an item auction of an on-line game to prevent a disadvantage to a user who does not use the auto program.

Further, the present invention has been made in an effort to provide an auto program preventing server for an item auction house of an on-line game which prevents an auto program from participating in the item auction of an on-line game so as to prevent an unnecessary load which may be caused in an auction server and increase a successful bidding possibility for a desired item of normal users.

Technical Solution

An exemplary embodiment of the present invention provides an auto program preventing method for an item auction house of an on-line game including: receiving a search request for an item from a user terminal in an auction house where an auction service provider server of an on-line game registers an item for an on-line game and auctions off the item to a user who bids the highest price for the registered item; determining whether the number of times of searching the same item within a predetermined time exceeds a predetermined number of times by analyzing the search request received from the user terminal; and transmitting, when the number of times of searching exceeds the predetermined number of times, a latest search result among search results corresponding to previous search requests to the user terminal as a search result corresponding to the recently received search request after a predetermined search ignoring period passes.

The determining may include incrementing the number of same searches by one when the item which is previously searched by the user is the same as a currently searched item and the transmitting may include determining the search ignoring period so as to be increased in proportion to the number of same searches, and the final search result is provided to the user terminal again after the determined search ignoring period passes.

The method may further include initializing the number of same searches when a difference between a time when the previous search request is received and the currently searched time exceeds a predetermined interval or the item which is previously searched is different from an item which is currently searched.

Another exemplary embodiment of the present invention provides an auto program preventing method for an item auction house of an on-line game, including: receiving a search request for an item from a user terminal in an auction house where an auction service provider server of an on-line game registers an item for an on-line game and auctions off the item to a user who bids the highest price for the registered item; determining whether the number of times of receiving the search request exceeds a predetermined number of times by analyzing the search request received from the user terminal; determining whether an average search time interval between the predetermined number of times of search requests is shorter than a predetermined search time interval when the number of times of receiving exceeds the predetermined number of times; and restricting the user terminal from searching an item using the auction service provider server during a predetermined search restriction period when the average search time interval is shorter than the predetermined search time interval.

The restricting of search may include determining the search restriction period so as to be increased as the average search time interval is shorter, and prohibiting the search of the item during the determined search restriction period.

The prohibiting of the search may include transmitting a message indicating that the search time is delayed due to excessive search requests to the user, and ignoring the search request until the search restriction period passes.

Still another exemplary embodiment of the present invention provides an auto program preventing method for an item auction house of an on-line game, including: receiving a bidding request for an item from a user terminal in an auction house where an auction service provider server of an on-line game registers an item for an on-line game and auctions off the item to a user who bids the highest price for the registered item; determining whether the number of times of receiving the bidding request exceeds a predetermined number of times by analyzing the bidding request received from the user terminal; determining whether an average bidding time interval between the predetermined number of times of bidding requests is shorter than a predetermined bidding time interval when the number of times of receiving exceeds the predetermined number of times; and restricting the user terminal from bidding for an item using the auction service provider server during a predetermined bidding restriction period when the average bidding time interval is shorter than the predetermined bidding time interval.

The restricting of bidding may include determining the bidding restriction period so as to be increased as the average bidding time interval is short, and prohibiting the bidding for the item during the determined bidding restriction period.

The prohibiting of bidding may include transmitting a message indicating that the bidding time is delayed due to excessive bidding requests to the user, and ignoring the bidding request until the bidding restriction period passes.

Yet another exemplary embodiment of the present invention provides an auto program preventing server for an item auction house of an on-line game, including a repeated search ignoring unit which ignores a search during a predetermined search ignoring period when the same item is searched a number of times or more within a predetermined time, in an auction house where an item for an on-line game is registered and the item is auctioned off to a user who bids the highest price for the registered item; an excessive search restricting unit which, when the search is requested the predetermined number of times or more, if an average search time interval between the predetermined number of times of search requests is shorter than a predetermined search time interval, restricts the search in the item auction house during a predetermined search restriction period; and an excessive bidding restricting unit which, when the predetermined number of times or more of bidding requests are issued in the item auction house, if the average bidding time interval between the predetermined number of times of bidding requests is shorter than the predetermined bidding time interval, restricts the bidding during a predetermined bidding restriction period.

The repeated search ignoring unit may receive the search request for an item from the user terminal, determine whether the number of times of searching the same item within a predetermined time exceeds a predetermined number of times by analyzing the search request received from the user terminal, and when the number of times of searching exceeds the predetermined number of times, transmit a latest search result among search results corresponding to previous search requests to the user terminal as a search result corresponding to the recently received search request after a predetermined search ignoring period passes.

The repeated search ignoring unit may increment the number of same searches by one when the item which is previously searched by the user is the same as a currently searched item, determine the search ignoring period so as to be increased in proportion to the number of same searches, and provide the final search result to the user terminal again after the determined search ignoring period passes.

The repeated search ignoring unit may initialize the number of same searches when a difference between a time when the previous search request is received and the currently searched time exceeds a predetermined interval or the item which is previously searched is different from an item which is currently searched.

The excessive search restricting unit may receive the search request for an item from the user terminal, determine whether the number of times of receiving the search request exceeds a predetermined number of times by analyzing the search request which is received from the user terminal, determine whether an average search time interval between the predetermined number of times of search requests is shorter than a predetermined search time interval when the number of times of receiving exceeds the predetermined number of times, and restrict the user terminal from searching an item using the auction service provider server during a predetermined search restriction period when the average search time interval is shorter than the predetermined search time interval.

The excessive search restricting unit may determine the search restriction period so as to be increased as the average search time interval is shorter and prohibit the search of the item during the determined search restriction period.

The excessive search restricting unit may transmit a message indicating that the search time is delayed due to excessive search requests to the user in order to prohibit the search of the item and ignore the search request until the search restriction time passes.

The excessive bidding restricting unit may receive a bidding request for an item from the user terminal, determine whether the number of times of receiving the bidding request exceeds a predetermined number of times by analyzing the bidding request received from the user terminal, determine whether an average bidding time interval between the predetermined number of times of bidding requests is shorter than a predetermined bidding time interval when the number of times of receiving exceeds the predetermined number of times, and restrict the user terminal from bidding for an item using the auction service provider server during a predetermined bidding restriction period when the average bidding time interval is shorter than the predetermined bidding time interval.

The excessive search restricting unit may determine the bidding restriction period so as to be increased as the average bidding time interval is short and prohibit the bidding for the item during the determined bidding restriction period.

The excessive bidding restricting unit may transmit a message indicating that the bidding time is delayed due to excessive bidding requests to the user in order to prohibit the bidding of the item and ignore the bidding request until the bidding restriction time passes.

Still yet another exemplary embodiment of the present invention provides a computer readable recording medium in which a program which implements the auto program preventing method for an item auction house of an on-line game according to an exemplary embodiment of the present invention is recorded.

Advantageous Effects

According to an exemplary embodiment of the present invention, an auto program which automatically participates in an item auction of an on-line game is detected so that a disadvantage to users who do not use the auto program caused by the auto program may be prevented.

Further, according to an exemplary embodiment of the present invention, an auto program is prevented from participating in the item auction of an on-line game so that an unnecessary load in an auction server is prevented from being created and a successful bidding possibility for a desired item of normal users is increased.

Furthermore, according to an exemplary embodiment of the present invention, users are prevented from participating in an auction of items using an auto program so that panic buying of highly popular item may be prevented.

MODE FOR INVENTION

Hereinafter, an auto program preventing method and server for an item auction according to exemplary embodiments of the present invention will be described with reference to the accompanying drawings.

In the following description, in order to clearly understand the present invention, description of a known technology regarding a characteristic of the present invention will be omitted. It is obvious that the following exemplary embodiment is a detailed description which is provided for more understanding of the present invention but does not limit the scope of the present invention. Therefore, an equivalent invention which performs the same function as the present invention may also be covered by the scope of the present invention.

When reference numerals denote constituent elements in the drawings, like constituent elements may be denoted by like reference numerals even in different drawings. When it is judged that specific description on known configurations or functions related in the description of the present invention may unnecessarily obscure the essentials of the present invention, the detailed description will be omitted.

Further, terminologies such as first, second, A, B, (a), and (b) may be used to describe constituent elements of the present invention. Such terminologies are used to distinguish a constituent element from the other constituent elements, but a nature, an order, or a sequence of the constituent element is not limited by the terminologies. When it is described that an element is "connected to", "coupled to", or "accesses" another element, it may be understood that the element is directly coupled to or accesses the other element or a third element may be "connected to", "coupled to", or "accesses" between the elements.

Figure 1:
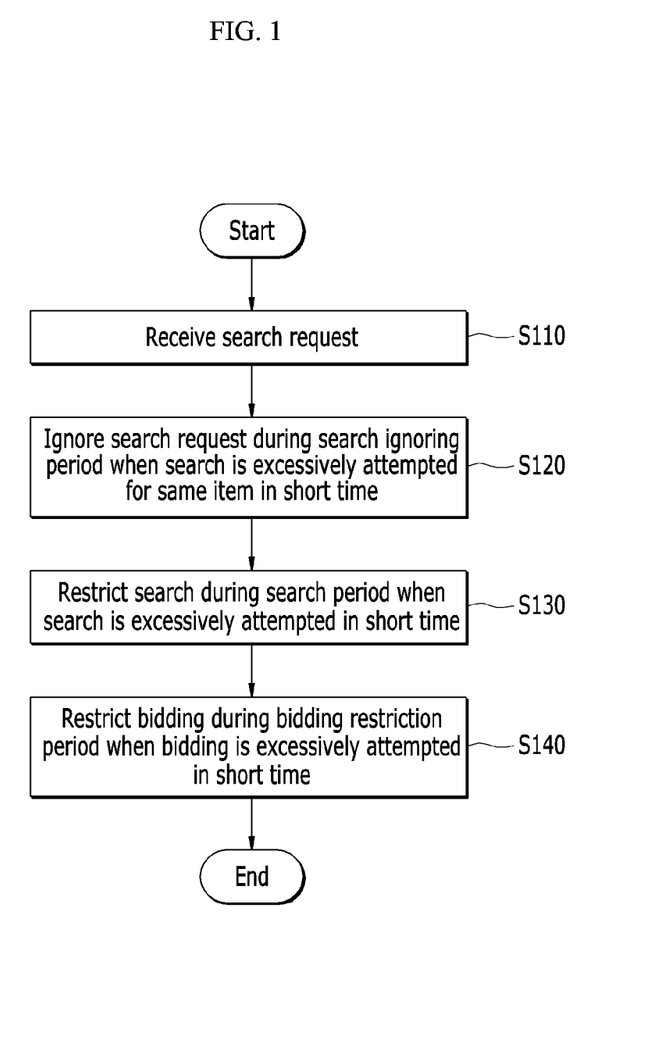
FIG. 1 is a flowchart conceptually illustrating an auto program preventing method for an item auction house of an on-line game according to an exemplary embodiment of the present invention.

FIG. 1 is a flowchart conceptually illustrating an auto program preventing method for an item auction house of an on-line game according to an exemplary embodiment of the present invention.

In the present invention, when a user continuously requests a search or repeatedly requests a search within a short time, in an auction house, the search request of the user is delayed depending on a condition.

Referring to FIG. 1, first, it is in a standby mode until a search request is received from a user in step S110. When the search request is received from the user, it is determined whether the request is excessively continuously repeated on the same item, and if the search request is excessively attempted, the search request is ignored during a search ignoring period in step S120.

In the present invention, it is determined whether the same search request is excessively repeated based on the number of repeated requests to search the same item in a predetermined time. Therefore, when it is determined that the same search request is excessively performed within a short time, a previous search result is displayed after being in a standby mode for a search ignoring period. In this case, there is no need to display a separate warning message. A user only determines that it takes lots of time to perform the search but does not know that the user's search request is ignored. A process which may be performed to ignore the same search request will be described in detail below with reference to FIG. 2.

When the search request of the user is not the excessive same search request, it is determined whether the search is excessively attempted within a short time, and as a result, if the search is excessively attempted within a short time, a warning message is displayed and the search is restricted so as to not be performed in step S130.

Further, when the search request of the user passes through the same search ignoring step and the excessive search request restricting step, it is determined that bidding of the user is excessively attempted. As a result, the warning message is displayed and the bidding is restricted in step S140.

When the search request of the user does not correspond to any of these steps, a job requested by the user is performed. For example, when the user requests to search, the search is performed, and if the user attempts to bid, the bidding of the user is reflected.

Simply put, for example, in the same search ignoring step, when the user repeatedly searches the same word ten times or more, the search request is ignored for a predetermined time, for example, five seconds. In this case, the search ignoring period may be set to be increased by five seconds whenever the user repeatedly searches the same word ten times.

Further, in the excessive search restricting step, for example, when the search is performed 20 times or more, if an average search interval is shorter than one second, a warning pop-up message is displayed and then the search may be restricted for 20 seconds.

Similarly, in the excessive bidding restricting step, when the bidding is performed 20 times or more, if an average bidding interval is shorter than one second, the warning pop-up message is displayed and then the bidding may be restricted for 20 seconds. It should be understood that such figures are used to illustrate the present invention but do not limit the present invention.

Figure 2:
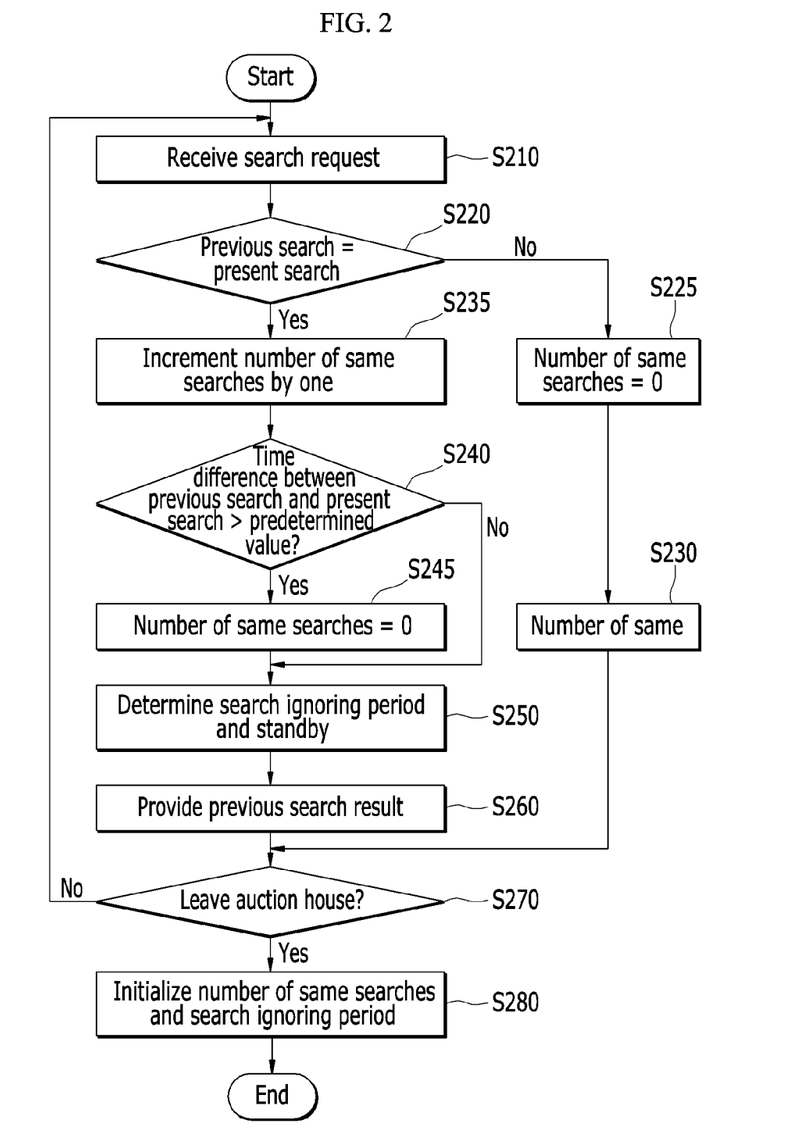
FIG. 2 is a flowchart conceptually illustrating an auto program preventing method for an item auction house of an on-line game according to a first aspect of the present invention.

FIG. 2 is a flowchart conceptually illustrating an auto program preventing method for an item auction house of an on-line game according to a first aspect of the present invention.

First, two variables of a search ignoring period and the number of same searches are allocated to the users who access a game. The variables are initiated to be zero when the user accesses the game. Further, whenever the user requests a search in an auction house, a word which is requested to be searched finally and a time when the user requests to search are stored.

When the search request is received from the user in step S210, first, it is determined whether a previous search word is the same as the present search word in step S220. If the previous search word is different from the present search word, the number of same searches is set to be zero in step S225. When the subsequent excessive search restricting step (step S130 in FIG. 1) and excessive bidding restricting step (step S140 of FIG. 1) are not performed, there is no reason to restrict the search any more so that a given search is performed in step S230.

However, when the present search word is the same as the previous search word, the number of same searches is increased by one in step S235. The number of same searches indicates the number of times of continuously performing search using the same search word and is used to determine the search ignoring period later.

Now, it is determined how much a difference is between a previous search time and a present search time in step S240. The reason why the difference between the previous search time and the present search time is considered is that it does not necessarily need to ignore or restrict the search because of the same search word.

Therefore, when the difference between the search times is large, the number of same searches is initialized in step S240. For example, when the user performs the same search again one minute after the previous search, it is considered as an extremely normal search process. Therefore, when the difference from the previous search request time is five seconds or longer, the number of same searches is initialized as zero. Further, when the user leaves the auction house, the number of same searches is initialized again.

When the search time difference is not so long, a search ignoring period is determined and then it is in a standby mode as long as the determined search ignoring period in step S250.

The search ignoring period means a time when it is in a standby mode without performing a search corresponding to the search request from the user. The search ignoring period is desirably determined to be increased as the number of same searches is increased. For example, the search ignoring period may be determined to be increased by five seconds whenever the number of same searches becomes a multiple of ten. In this case, the search ignoring period may be determined by the following Equation 1.

$$QUERY\_IGNORE\_PERIOD = 5 * int(SAME\_QUERY\_NUMBER) \quad \text{(Equation 1)}$$

In Equation 1, QUERY_IGNORE_PERIOD represents a search ignoring period, SAME_QUERY_NUMBER represents the number of same searches, and a function of int( ) represents a function of taking an integer part of a parameter.

The search ignoring period is decreased by one for every one second. Accordingly, even when the search ignoring period is 10, the search ignoring period is initialized as zero after ten seconds. Similar to the number of same searches, when the user leaves the auction house, the search ignoring period is initialized as zero. The reason is that a previous search result disappears when the user goes to another screen and then returns, so that the user is allowed to unconditionally perform search.

When the search ignoring period expires, no new search is performed but a previous search result is provided to the user in step S260. In this case, a search result which is the most recently performed, among previously performed search results, may be provided as the previous search result.

Finally, when the user leaves the auction house in step S270, the number of same searches and the search ignoring period are initialized.

If the user does not leave the auction house, a new search request is received in step S210.

Figure 3:
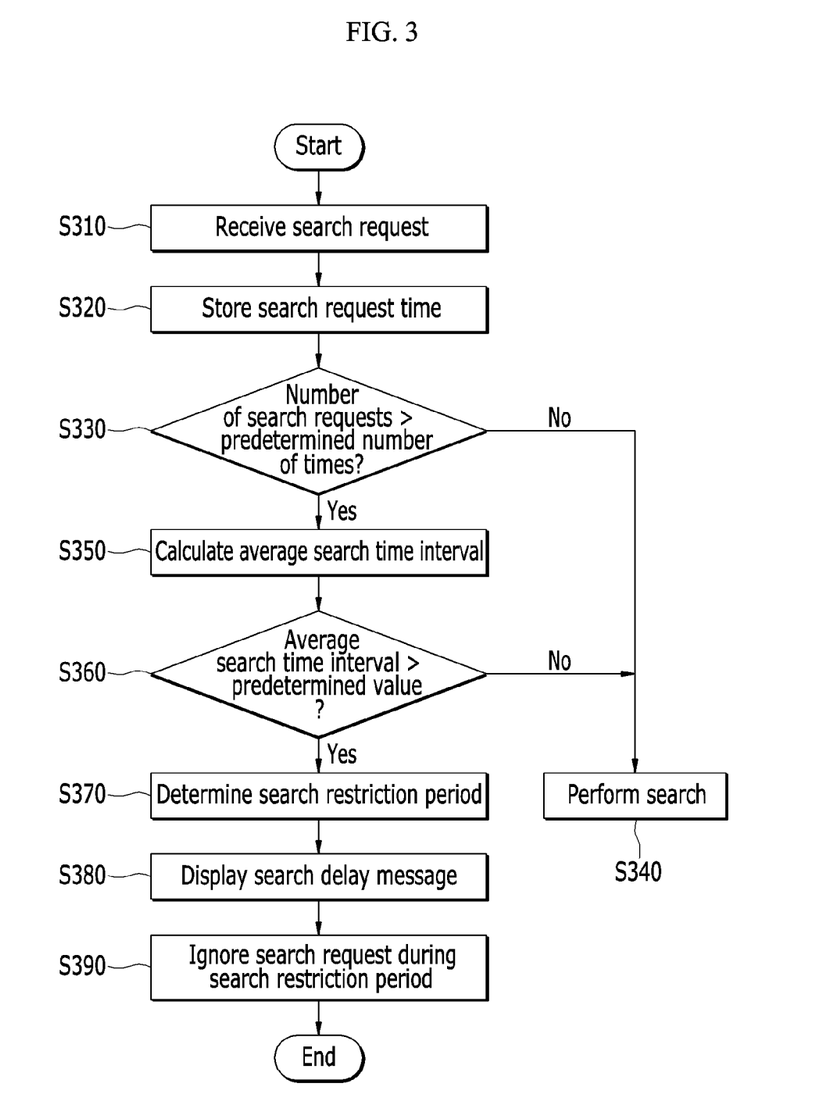
FIG. 3 is a flowchart conceptually illustrating an auto program preventing method for an item auction house of an on-line game according to a second aspect of the present invention.

FIG. 3 is a flowchart conceptually illustrating an auto program preventing method for an item auction house of an on-line game according to a second aspect of the present invention.

First, it is in a standby mode until a search request is received from a user. When the search request is received from the user in step S310, a search request time is stored in step S320. In this case, the search request time is stored as many as a predetermined number. The search request time is used to calculate an average search time interval indicating an interval between times when the user requests a search.

Therefore, when the stored search request time exceeds the predetermined number in step S330, an average search time interval which is an average of time differences between the stored search request times is calculated in step S350.

When the calculated average search time interval is larger than a predetermined value in step S360, in the present invention, it is determined that the user does not use an auto program but directly requests the search. Therefore, the search is performed in step S340.

However, when the calculated average search time interval is smaller than the predetermined value, it means that the user uses the auto program to request the search. Therefore, a search restriction period is determined in step S370. The search restriction period may be set to be increased as the average search time interval is shorter. For example, when the average search time interval is 0.1 second, the search restriction period may be determined as 10 seconds, and when the average search time interval is 0.5 second, the search restriction period may be determined as 2 seconds. Accordingly, when a lot of search requests are issued using the auto program within a short time, the search restriction period may become longer.

When the search restriction period is determined, a search delaying message is displayed in step S380. The search is ignored while the search delaying message is displayed in step S390.

In the present invention, the search request time may be implemented like a queue which may store at most 20 values. Therefore, when the user presses a search button, the time when the search request is issued is accumulated in the search request time. The search request time may maintain an auction search time for the most recent 20 times. When the search restriction is assigned to the user, even though the user presses the search button, the time is not stored.

Figure 4:
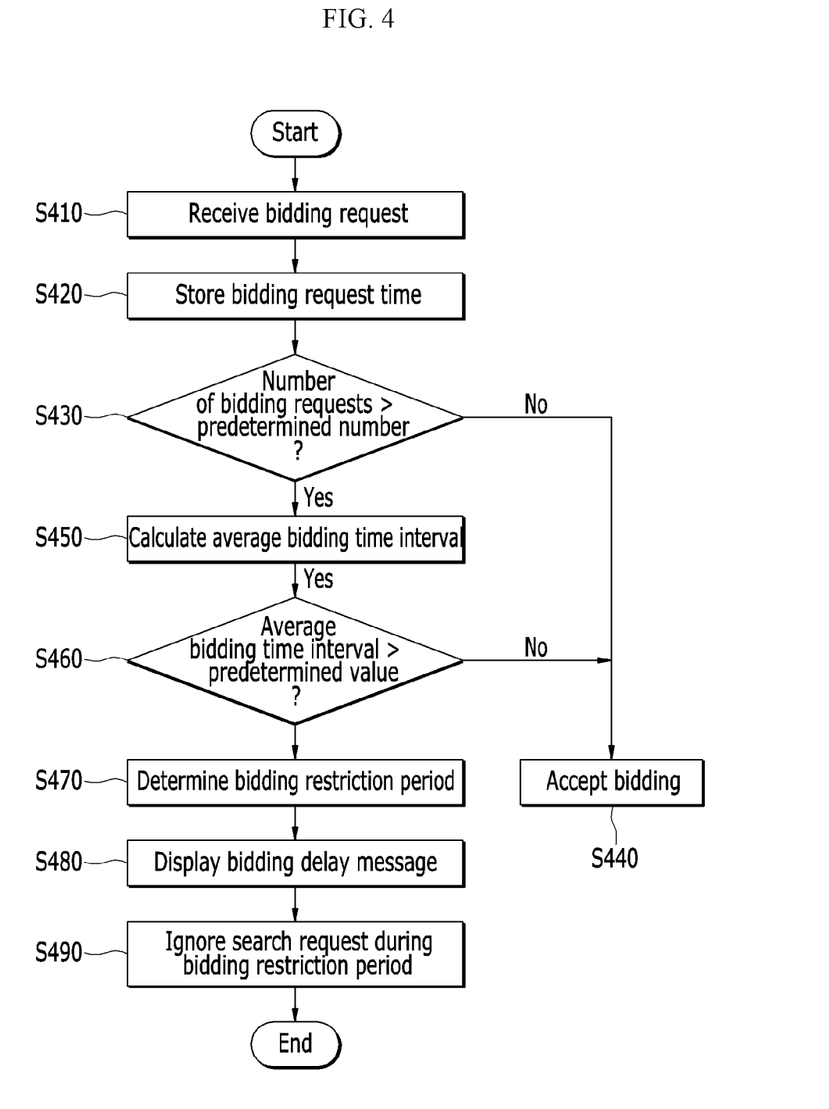
FIG. 4 is a flowchart conceptually illustrating an auto program preventing method for an item auction house of an on-line game according to a third aspect of the present invention.

FIG. 4 is a flowchart conceptually illustrating an auto program preventing method for an item auction house of an on-line game according to a third aspect of the present invention.

First, it is in a standby mode until a bidding request is received from a user. When the bidding request is received from the user in step S410, a bidding request time is stored in step S420. In this case, the bidding request time is stored as many as a predetermined number. The bidding request time is used to calculate an average bidding time interval indicating an interval between times when the user requests bidding.

Therefore, when the stored bidding request time exceeds the predetermined number in step S430, an average bidding time interval which is an average of time differences between the stored bidding request times is calculated in step S450.

As a result of determination, when the calculated average bidding time interval is larger than a predetermined value in step S460, in the present invention, it is determined that the user does not use an auto program but directly requests the bidding. Therefore, the bidding is accepted in step S440.

However, when the calculated average bidding time interval is smaller than the predetermined value, it means that the user uses the auto program to perform the bidding. Therefore, a bidding restriction time is determined in step S470. The bidding restriction time interval may be set to be increased as the average bidding time interval is shorter. For example, when the average bidding time interval is 0.1 second, the bidding restriction period may be determined as 10 seconds, and when the average bidding time interval is 0.5 second, the bidding restriction period may be determined as 2 seconds. Accordingly, when a lot of bidding requests are issued using the auto program in a short time, the bidding restriction period may become longer.

When the bidding restriction time is determined, a bidding delaying message is displayed in step S480. The bidding is ignored while the bidding delaying message is displayed in step S490.

In the present invention, the bidding request time may be implemented like a queue which may store at most 20 values. Therefore, when the user presses a bidding button, the time when the bidding request is issued is accumulated in the bidding request time. The bidding request time may maintain an auction bidding time for the most recent 20 times. It is obvious that when the bidding restriction is assigned to the user, even if the user presses the bidding button, the time is not stored.

Hereinafter, an on-line game system according to another aspect of the present invention will be described in detail with reference to FIG. 5.

Figure 5:
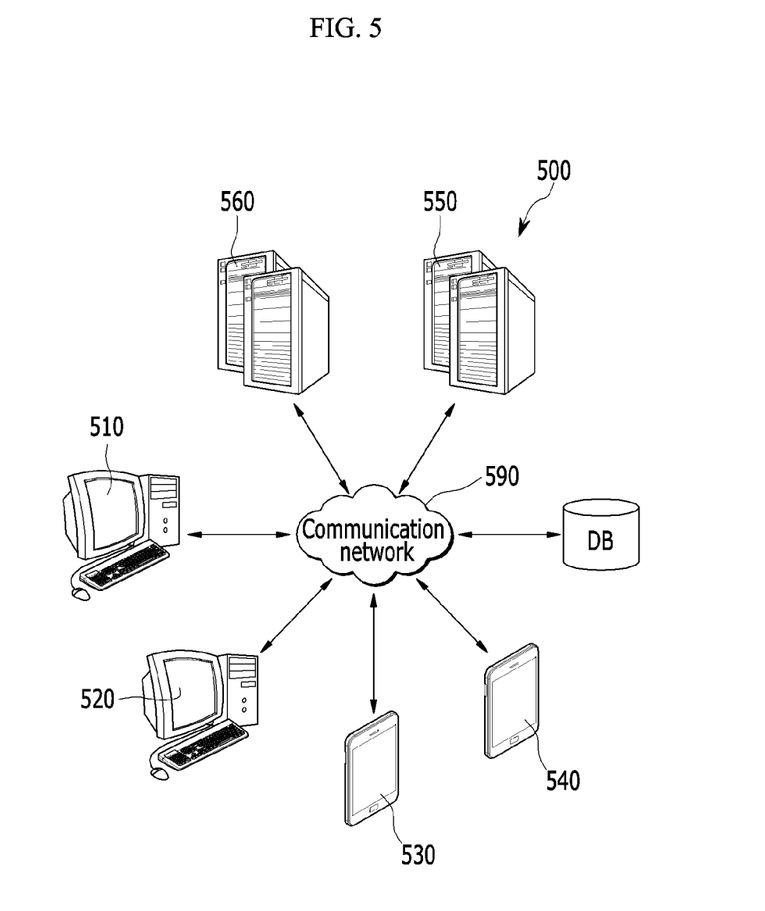
FIG. 5 is a block diagram conceptually illustrating an on-line game system to which an auto program preventing method for an item auction house of an on-line game according to an exemplary embodiment of the present invention is applied.

FIG. 5 is a block diagram conceptually illustrating an on-line game system to which an auto program preventing method for an item auction house of an on-line game according to an exemplary embodiment of the present invention is applied.

Referring to FIG. 5, an on-line game system 500 according to an exemplary embodiment of the present invention includes an on-line game server 550 which provides an on-line game service, and a plurality of on-line game clients 510, 520, 530, and 540 which access the on-line game server 550 through a communication network 590. The on-line game system 500 further includes a database 580 in which the number of same searches, a search ignoring period, a search request time, and information on items which are registered in an auction house are stored, and an auto program preventing server 560 for an item auction house.

In the present invention, a game server or an on-line game server indicates a server computer which a user accesses to use game contents. In the case of a game which has a small capacity or is used by a small number of users, a plurality of game programs may be operated in one game server. Further, in the case of a game which has a very large capacity or has a large number of real-time accessing users, one or more game servers may be provided to operate one game in accordance with a function of the game.

Further, even though middleware for the database or servers which perform a payment process may be connected to the game server, description thereof may be omitted in the present invention.

The on-line game clients 510, 520, 530, and 540 include various terminals which may access the on-line game server 550 through the communication network 590. In FIG. 5, desktop computers 510 and 520 and portable phones 530 and 540 are illustrated as on-line game clients, but the present invention is not limited thereto.

The user accesses the on-line game server 550 through the various on-line game clients 510, 520, 530, and 540. Particularly, in accordance with development of electronic engineering techniques, the user may access the on-line game server 550 through various on-line game clients 510, 520, 530, and 540 via various communication networks anytime and anywhere. For example, the communication network 590 may be the Internet or a mobile communication network such as a 2G, 3G, or 4G network. In this specification, "communication", a "communication network", and a "network" may be used to have the same meaning. The three terminologies indicate a wired or wireless short distance and broad area data transmitting and receiving network which may transmit and receive a file between a user terminal, terminals of other users, and a download server.

In FIG. 5, the auto program preventing server 560 for an item auction house implements an operation in accordance with an auto program preventing method for an item auction house of an on-line game according to an aspect of the present invention. A configuration and an operation of the auto program preventing server 560 for an item auction house will be described in detail below with reference to FIG. 6. For the purpose of simplifying the specification, redundant description will be omitted.

In the present invention, the on-line game refers to game contents which are used by a user by accessing the above-mentioned game server. Particularly, the on-line game refers to a game which a plurality of users may simultaneously access to enjoy the game and which the user proceeds to increase a level by a behavior that promotes a character and obtains an experience point. Further, in order to smoothly proceed with the game, various types of items may be purchased.

In FIG. 5, the auto program preventing server 560 for an item auction house is illustrated as a separate device from the on-line game server 550. However, the auto program preventing server 560 for an item auction house does not necessarily need to be separated from the on-line game server 550. The on-line game server 550 may be implemented to be integrated to combine with a function of the auto program preventing server 560 for an item auction house.

That is, even though it is described that all constituent elements which configure the exemplary embodiment of the present invention are combined in one body or separately operate, the present invention is not limited to such an exemplary embodiment. That is, within a range of the object of the present invention, one or more of all constituent elements may be selectively combined to be operated. Further, all constituent elements may be individually implemented by independent hardware, but some or all of the constituent elements are selectively combined to be implemented as a computer program having a program module which performs some or all of the combined functions in one or a plurality of pieces of hardware. Codes or code segments which constitute the computer program may be easily inferred by a person of ordinary skill in the art to which the present invention pertains. Such a computer program is stored in computer readable media to be read and executed by a computer so as to implement the exemplary embodiment of the present invention. Storage media of a computer program may include magnetic recording media or optical recording media.

When the on-line game system 500 illustrated in FIG. 5 is used, the user is prevented from participating in the auction using the auto program.

Figure 6:
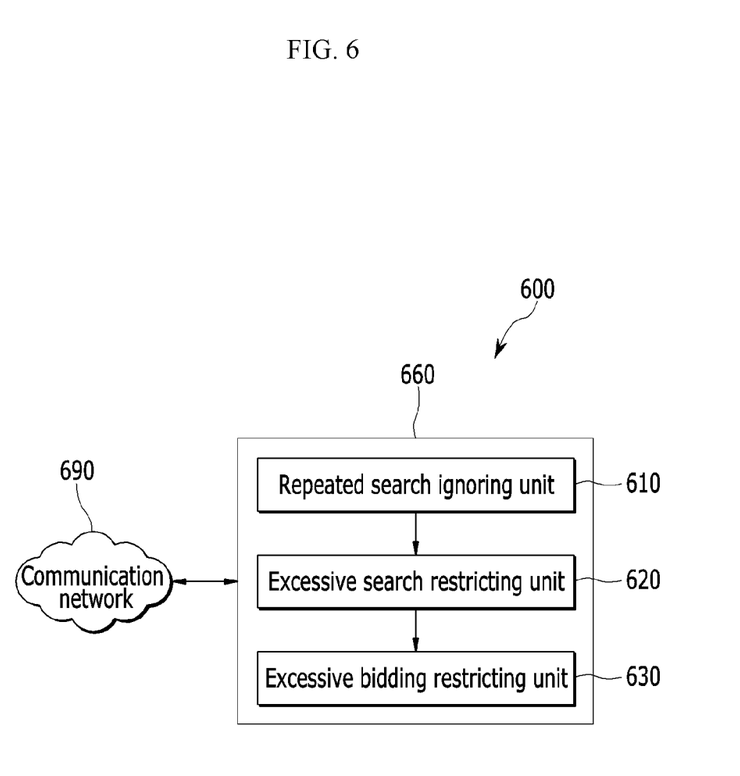
FIG. 6 is a block diagram illustrating an operation of an auto program preventing server for an item auction house of an on-line game according to another aspect of the present invention.

FIG. 6 is a block diagram illustrating an operation of an auto program preventing server for an item auction house of an on-line game according to another aspect of the present invention.

Referring to FIG. 6, an auto program preventing server 660 for an item auction house accesses a communication network 690 to be operated. An on-line game client accesses the auto program preventing server 660 for an item auction house through the communication network 690. In this case, when the communication network 690 is considered as a transparent channel, the whole unit 600 including the communication network 690 and the auto program preventing server 660 for an item auction house may be considered as an auto program preventing server for an item auction house.

The auto program preventing server 660 for an item auction house includes a repeated search ignoring unit 610, an excessive search restricting unit 620, and an excessive bidding restricting unit 630.

In order to perform the above operation, when the user requests to search an item in the item auction house, the repeated search ignoring unit 610 determines whether the previously searched item is the same as the currently searched item. As a result of the determination, when the previously searched item is not the same as the currently searched item, the repeated search ignoring unit 610 initializes the number of same searches and performs the search. In contrast, when the previously searched item is the same as the currently searched item, the repeated search ignoring unit 610 increments the number of same searches by one, and initializes the number of same searches when a difference between the previous search time and the present search time is equal to or larger than a predetermined value.

If the difference between the previous search time and the present search time is smaller than the predetermined value, the repeated search ignoring unit 610 determines a search ignoring period which is increased as the number of same searches is increased. As a result, the repeated search ignoring unit 610 provides a previous search result to the user again after being in a standby mode during the search ignoring period.

The search ignoring period may be determined to be correspondingly increased as the number of same searches is increased as described above.

As described above, when the user repeatedly requests (clicks a search button) to search the same search word several times, the repeated search ignoring unit 610 which is included in the auto program preventing server for an item auction house of an on-line game according to the exemplary embodiment of the present invention shows the previous result to the user as if the search is performed, instead of ignoring the search request of the user internally. That is, a pop-up message indicating that the search is processing is shortly displayed and then disappears as if the search is actually performed and the previous search result is shown.

The excessive search restricting unit 620 restricts the search so as to not be performed when the search request is excessively received from the user within a short time. That is, when the search request is received, the excessive search restricting unit 620 stores the search request time and determines whether the number of stored search request times is equal to or larger than a predetermined number. If the predetermined number or more of search request times is stored, the excessive search restricting unit 620 calculates an average search time interval and determines whether the average search time interval is equal to or smaller than a predetermined value.

When the average search time interval is equal to or smaller than the predetermined value, the excessive search restricting unit 620 determines a search restriction period and prohibits the search for the determined search restriction period, but when the average search time interval is equal to or larger than the predetermined value, the excessive search restricting unit 620 does not restrict the search but performs the search.

The excessive search restricting unit 620 transmits a message indicating that the search time is delayed due to excessive search requests in order to prohibit the search during the search restriction period to the user and ignores the search request until the search restriction period passes.

Figure 7:
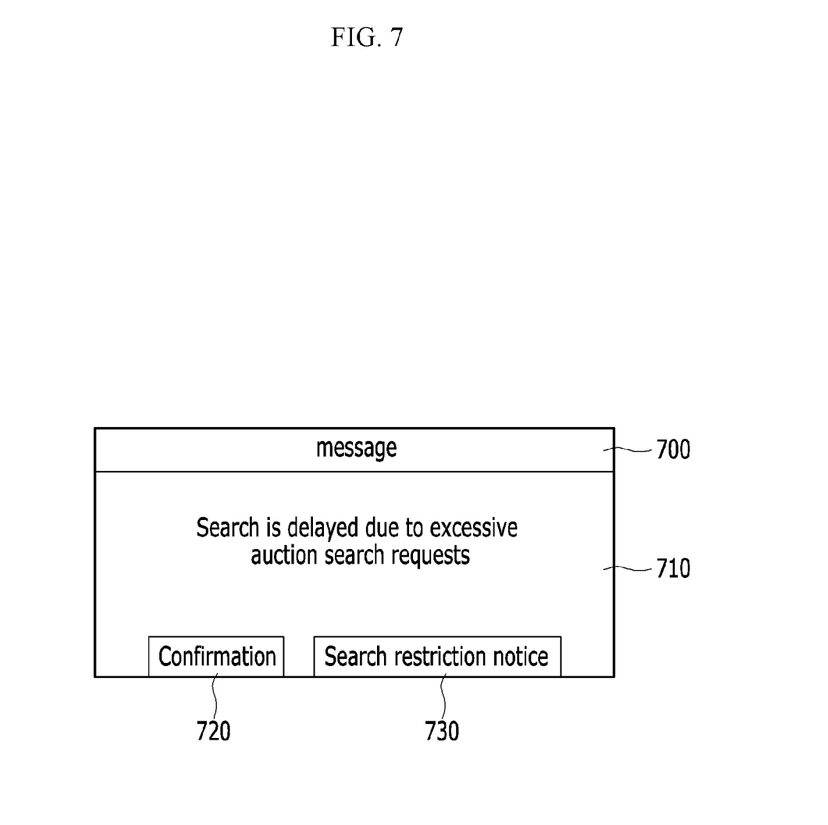
FIG. 7 is a view illustrating a message which is provided to a user when a number of searching requests is excessive in the present invention.

FIG. 7 is a view illustrating a message which is provided to a user when a number of searching requests is excessive in the present invention.

A message 700 illustrated in FIG. 7 includes a content displaying section 710, a confirmation button 720, and a search restriction policy notice button 730. In the content displaying section 710, a message notifying that the search is delayed due to excessive search requests is displayed. If so, the user presses the confirmation button 720 to remove the displayed message 700 or presses the search restriction policy notice button 730 to read information on a search restriction policy. The search restriction policy shows how many search request times are used to determine an average search time interval, how to determine the search restriction period, and what a value of an average search time interval which restricts the search is.

Referring to FIG. 6 again, for example, when the user presses the search button, if 20 times are stored as the search request time and the average search interval is shorter than one second for twenty times, the excessive search restricting unit 620 may set the search restriction period as twenty seconds. In this case, when the search restriction period is already set, the search restriction period is not initialized. That is, even though the search button is pressed while the search is restricted, the search restriction period is not increased. When the search restriction period is one second or longer, the search restriction period is decreased by one for every second.

Hereinafter, the excessive bidding restricting unit 630 will be described. Differently from the repeated search ignoring unit 610 which ignores the search when the same search is repeatedly attempted and the excessive search restricting unit 620 which ignores the search when the search is excessively requested within a short time, the excessive bidding restricting unit 630 ignores the bidding when the bidding is excessively attempted in the auction within a short time.

When the bidding request is excessively received from the user within a short time, the excessive bidding restricting unit 630 restricts the user to not bid any more to restrict the auto program. That is, when the bidding request is received, the excessive bidding restricting unit 630 stores a bidding request time and determines whether the number of stored bidding request times is equal to or larger than a predetermined number. If the predetermined number or more of bidding request times are stored, the excessive bidding restricting unit 630 calculates an average bidding time interval indicating an average time difference between stored bidding request times, and determines whether the average bidding time interval is equal to or smaller than a predetermined value.

When the average bidding time interval is equal to or smaller than the predetermined value, the excessive bidding restricting unit 630 determines a bidding restriction time and prohibits the bidding for the determined bidding restriction time. In contrast, when the average bidding time interval is equal to or larger than the predetermined value, the excessive bidding restricting unit 630 does not restrict the bidding anymore and accepts the bidding.

The excessive bidding restricting unit 630 transmits a message indicating that the bidding time is delayed due to excessive bidding requests to the user in order to prohibit the bidding during the bidding restriction time and ignores the bidding request until the bidding restriction period passes.

Figure 8:
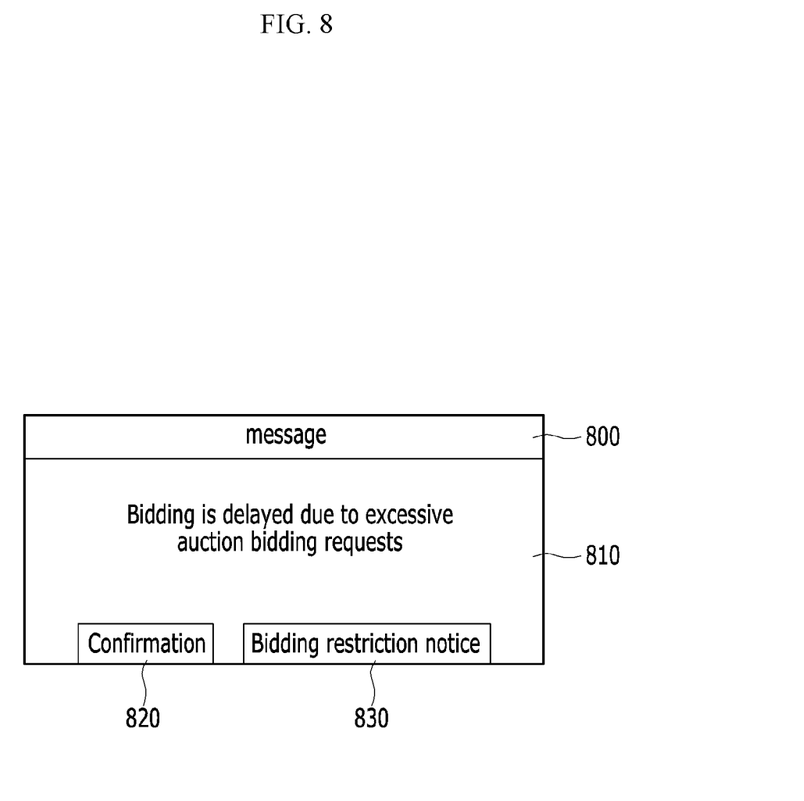
FIG. 8 is a view illustrating a message which is provided to a user when a number of bidding requests is excessive in the present invention.

FIG. 8 is a view illustrating a message which is provided to a user when bidding requests are excessive in the present invention.

A message 800 illustrated in FIG. 8 includes a content displaying section 810, a confirmation button 820, and a bidding restriction policy notice button 830. In the content displaying section 810, a message notifying that the bidding is delayed due to excessive bidding requests is displayed. If so, the user presses the confirmation button 820 to remove the displayed message 800 or presses the bidding restriction policy notice button 830 to read information on a search restriction policy. The bidding restriction policy shows how many bidding request times are used to determine an average bidding time interval, how to determine the bidding restriction time, and what a value of an average bidding time interval which restricts the bidding is.

The above-described auto program preventing method for an item auction house according to the exemplary embodiment of the present invention may be executed by an application (which may include a program which is included in a platform or an operating system which is basically mounted in a terminal) which is basically installed in a terminal, or executed by an application (that is, a program) which is directly installed in the terminal by a user through an application provider server such as an application store server or a web server related to an application or the service. In this way, the above-described auto program preventing method for an item auction house according to the exemplary embodiment of the present invention may be implemented by an application (that is, a program) which is basically installed in the terminal or directly installed by a user or recorded in computer readable recording media such as a terminal.

Such a program is recorded in computer readable recording media and executed by a computer to perform the above-described functions.

As described above, in order to execute the above-described auto program preventing method for an item auction house according to the exemplary embodiment of the present invention, the above-mentioned program may include a code which is coded by a computer language such as C, C++, JAVA, or a machine language which may be read by a processor (CPU) of the computer.

Such a code may include a function code related with a function which defines the above-mentioned functions and a control code which is related with an executing procedure which is required for the processor of the computer to execute the above-mentioned functions in accordance with a predetermined procedure.

Further, the code may include additional information required to execute the above-mentioned functions by the processor of the computer or a memory reference related code indicating a location (an address number) of an internal or external memory of the computer where the media is referenced.

In addition, when communication with another remote computer or server is required to execute the above-mentioned functions by the computer processor, the code may further include a communication related code indicating how to communicate with another remote computer or server by the computer processor using a communication module (for example, wired and/or wireless communication module) of the computer or which information or media is transmitted or received at the time of communication.

Further, a functional program, a code, or code segment related thereto which implements the present invention may be easily inferred or modified by programmers skilled in the art to which the present invention pertains in consideration of a system environment of the computer which reads the recording media and executes the program.

Computer readable media in which the above-described program is recorded may include, for example, a ROM, a RAM, a CD-ROM, a magnetic tape, a floppy disk, and an optical media storage device.

Further, the computer readable recording media in which the program as described above is recorded is distributed to computer systems which are connected by a network so that a computer readable code may be stored and executed in a distributed manner. In this case, one or more computers among a plurality of distributed computers execute some of the above-suggested functions and transmit the execution result to one or more of other distributed computers, and a computer which receives the result executes some of the above-suggested functions and provides the result to other distributed computers.

Particularly, a computer readable recording medium in which an application, that is, a program for executing the auto program preventing method for an item auction house according to the exemplary embodiments of the present invention is recorded may be a storage medium (for example, a hard disk) which is included in an application provider server such as an application store server or a web server related with an application or the service or the application provider server itself.

A computer which may read a recording medium in which an application which is a program for executing the auto program preventing method for an item auction house according to the exemplary embodiments of the present invention is recorded may include not only a general PC such as a general desktop computer or a notebook computer but also a mobile terminal such as a smart phone, a tablet PC, a personal digital assistant (PDA), and a mobile communication terminal, and may be interpreted as all computable equipment.

Further, when the computer which may read a recording medium in which an application which is a program for executing the auto program preventing method for an item auction house according to the exemplary embodiments of the present invention is recorded is a mobile terminal such as a smart phone, a tablet PC, a PDA, or a mobile communication terminal, the application is downloaded from the application provider server to the general PC and installed in the mobile terminal through a synchronizing program.

In addition, unless explicitly described to the contrary, the words "comprise", "configure", and "have" will be understood to imply the inclusion of stated elements but not the exclusion of any other elements. Unless differently defined, all terminologies including technical or scientific terminology may have the same meaning which is generally understood by those skilled in the art. Generally used terminologies defined in a dictionary shall be construed as having meanings matching those in the context of a related art, and shall not be construed in ideally or excessively formal meanings unless they are clearly defined in the present invention.

The above description illustratively describes the technical spirit of the present invention, and various changes and modifications may be allowed by those skilled in the art without departing from the essential property of the present invention. Therefore, the exemplary embodiments disclosed in the present invention do not restrict but illustrate a technical spirit of the present invention, and the scope of the technical spirit of the present invention is not limited by the exemplary embodiments. A protective range of the present invention may be interpreted by the appended claims, and all technical spirits in the equivalent range may be covered by the scope of the present invention.

The invention claimed is:

1. An auto program preventing method for an item auction house of an on-line game, the method comprising:
    receiving a search request for an item from a user terminal in an auction house where an auction service provider server of an on-line game registers an item for an on-line game and auctions off the item to a user who bids the highest price for the registered item;
    determining whether the number of times of searching the same item within a predetermined time exceeds a predetermined number of times by analyzing the search request received from the user terminal; and
    transmitting, when the number of times of searching exceeds the predetermined number of times, a latest search result among search results corresponding to previous search requests to the user terminal as a search result corresponding to the recently received search request after a predetermined search ignoring period passes.

2. The method of claim 1, wherein:
    the determining includes
    incrementing the number of same searches by one when the item which is previously searched by the user is the same as a currently searched item; and
    the transmitting includes
    determining the search ignoring period so as to be increased in proportion to the number of same searches,
    wherein the final search result is provided to the user terminal again after the determined search ignoring period passes.

3. The method of claim 2, further comprising
    initializing the number of same searches when a difference between a time when the previous search request is received and the currently searched time exceeds a predetermined interval or the item which is previously searched is different from an item which is currently searched.

4. The method of claim 1, further comprising:
    after the receiving of a search request,
    determining whether the number of times of receiving the search request exceeds a predetermined number of times by analyzing the search request which is received from the user terminal;
    determining whether an average search time interval between the predetermined number of times of search requests is shorter than a predetermined search time interval when the number of times of receiving exceeds the predetermined number of times; and restricting the user terminal from searching an item using the auction service provider server during a predetermined search restriction period when the average search time interval is shorter than the predetermined search time interval.

5. The method of claim 4, wherein the restricting of search includes:
determining the search restriction period so as to be increased as the average search time interval is shorter; and
prohibiting the search of the item during the determined search restriction period.

6. An auto program preventing method for an item auction house of an on-line game, the method comprising:
receiving a bidding request for an item from a user terminal in an auction house where an auction service provider server of an on-line game registers an item for an on-line game and auctions off the item to a user who bids the highest price for the registered item;
determining whether the number of times of receiving the bidding request exceeds a predetermined number of times by analyzing the bidding request received from the user terminal;
determining whether an average bidding time interval between the predetermined number of times of bidding requests is shorter than a predetermined bidding time interval when the number of times of receiving exceeds the predetermined number of times; and
restricting the user terminal from bidding for an item using the auction service provider server during a predetermined bidding restriction period when the average bidding time interval is shorter than the predetermined bidding time interval.

7. The method of claim 6, wherein the restricting of bidding includes:
determining the bidding restriction period so as to be increased as the average bidding time interval is short; and
prohibiting the bidding for the item during the determined bidding restriction period.

8. An auto program preventing server for an item auction house of an on-line game, the server comprising:
a repeated search ignoring unit which ignores a search during a predetermined search ignoring period when the same item is searched within a predetermined time a number of times which is equal to or larger than a predetermined number of times, in an auction house where an item for an on-line game is registered and the item is auctioned off to a user who bids the highest price for the registered item;
an excessive search restricting unit which, when the search is requested the number of times which is equal to or larger than a predetermined number of times, if an average search time interval between the predetermined number of times of search requests is shorter than a predetermined search time interval, restricts the search in the item auction house during a predetermined search restriction period; and
an excessive bidding restricting unit which, when the predetermined number of times or more of bidding requests are issued in the item auction house, if the average bidding time interval between the predetermined number of times of bidding requests is shorter than the predetermined bidding time interval, restricts the bidding during a predetermined bidding restriction period.

9. The server of claim 8, wherein the repeated search ignoring unit receives the search request for an item from the user terminal, determines whether the number of times of searching the same item within a predetermined time exceeds a predetermined number of times by analyzing the search request received from the user terminal, and when the number of times of searching exceeds the predetermined number of times, transmits a latest search result among search results corresponding to previous search requests to the user terminal as a search result corresponding to the recently received search request after a predetermined search ignoring period passes.

10. The server of claim 9, wherein the repeated search ignoring unit increments the number of same searches by one when the item which is previously searched by the user is the same as a currently searched item, determines the search ignoring period so as to be increased in proportion to the number of same searches, and provides the final search result to the user terminal again after the determined search ignoring period passes.

11. The server of claim 10, wherein the repeated search ignoring unit initializes the number of same searches when a difference between a time when the previous search request is received and the currently searched time exceeds a predetermined interval or the item which is previously searched is different from an item which is currently searched.

12. The server of claim 8, wherein the excessive search restricting unit receives the search request for an item from the user terminal, determines whether the number of times of receiving the search request exceeds a predetermined number of times by analyzing the search request which is received from the user terminal, determines whether an average search time interval between the predetermined number of times of search requests is shorter than a predetermined search time interval when the number of times of receiving exceeds the predetermined number of times, and restricts the user terminal from searching an item using the auction service provider server during a predetermined search restriction period when the average search time interval is shorter than the predetermined search time interval.

13. The server of claim 12, wherein the excessive search restricting unit determines the search restriction period so as to be increased as the average search time interval is shorter and prohibits the search of the item during the determined search restriction period.

14. The server of claim 8, wherein the excessive bidding restricting unit receives a bidding request for an item from the user terminal, determines whether the number of times of receiving the bidding request exceeds a predetermined number of times by analyzing the bidding request received from the user terminal, determines whether an average bidding time interval between the predetermined number of times of bidding requests is shorter than a predetermined bidding time interval when the number of times of receiving exceeds the predetermined number of times, and restricts the user terminal from bidding for an item using the auction service provider server during a predetermined bidding restriction period when the average bidding time interval is shorter than the predetermined bidding time interval.

15. The server of claim 14, wherein the excessive bidding restricting unit determines the bidding restriction period so as to be increased as the average bidding time interval is shorter and prohibits the bidding for the item during the determined bidding restriction period.

* * * * *